३,४७७,०३८
FREON-RARE GAS LASER
Mitsuyoshi Shimazu, Mitaka-shi, Japan, assignor to Hitachi, Ltd., Tokyo, Japan, a corporation of Japan
Filed Jan. 18, 1966, Ser. No. 521,259
Claims priority, application Japan, Jan. 22, 1965, 40/3,022
Int. Cl. H01s 3/22
U.S. Cl. 331—94.5       4 Claims

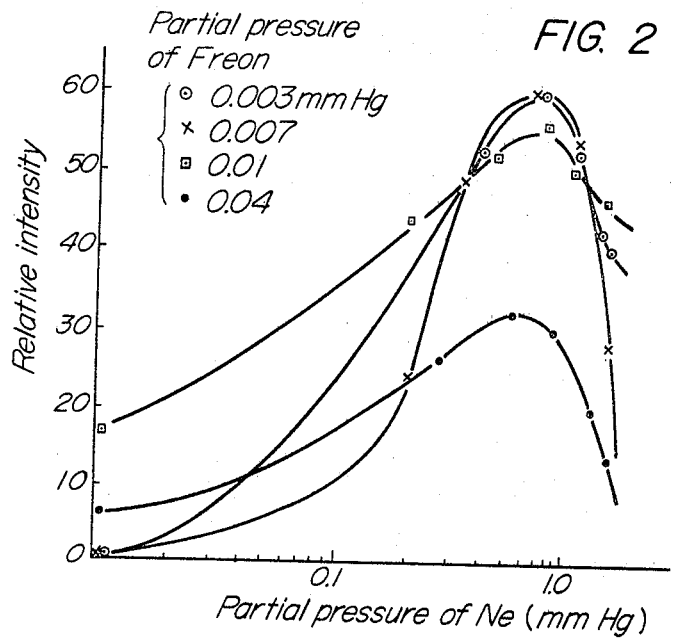
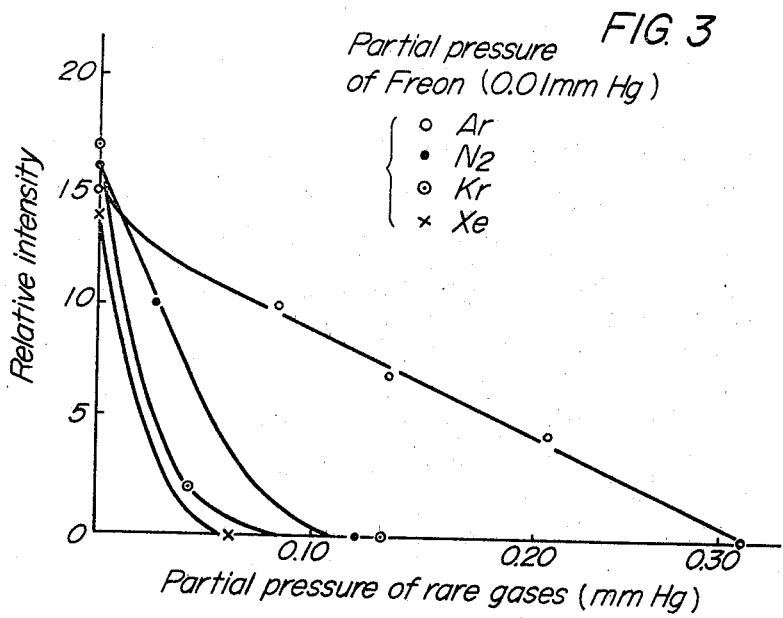

ABSTRACT OF THE DISCLOSURE

A gas laser employing a gas mixture of Freon ($CCl_2F_2$) and a rare gas.

---

The present invention relates to chlorine or chlorine compound gas lasers, and more particularly to gas lasers employing Freon ($CCl_2F_2$) as a laser material.

A gas laser employing a gas mixture as a laser material is such that, as disclosed, for example, in "Lasers-Generation of Light by Stimulated Emission," 1962, John Wiley and Sons, Inc., pages 91 to 93, in particular Figs. 31 and 32, a discharge is caused between two electrodes in a discharge tube including therein a gas mixture of He and Ne at a pressure of several mm. Hg disposed between a pair of reflectors to laser oscillate light having a specific wavelength among the light generated by the discharge.

The present invention is that which employs a novel laser material as a gas mixture to be filled in such a laser tube.

As is well known, W. R. Bennet and his coworkers of Bell Telephone Laboratories have succeeded in lasing by utilizing the molecular dissociation in gas mixtures, such as Ar-$O_2$, Ne-$O_2$ and the like, arising from atom-molecule collisions to excite the molecular gas and by realizing the state of energy distribution at a negative temperature between the particular energy levels. Also, the inventor of this invention has found that the lasing of lines of neutral nitrogen atoms can be effected by carrying out a discharge in a gas mixture such as Ne-$N_2$, He-$N_2$ or the like, and the lasing of lines of neutral carbon atom by carrying out a discharge in a mixture gas such as Ne-$CO_2$, He-$CO_2$ or the like, and such gas lasers are disclosed in Japanese Patent publication No. 24,270/67.

However, the output powers of the above-mentioned various gas lasers were at most 1 mw. each.

Therefore, an object of the present invention is to obtain high power gas lasers.

A description of the present invention will be given in conjunction with the accompanying drawings, in which:

FIG. 2 illustrates characteristic curves showing the variation of oscillation intensity according to the added quantity of Ne in the mixture of Freon gas and Ne gas; and FIG. 3 illustrates characteristic curves showing the decrease of oscillation intensity according to the added quantity of rare gas Ar, Kr or Xe or $N_2$ gas in the mixture of Freon-Ne or Freon-He of the invention.

Figure 1:
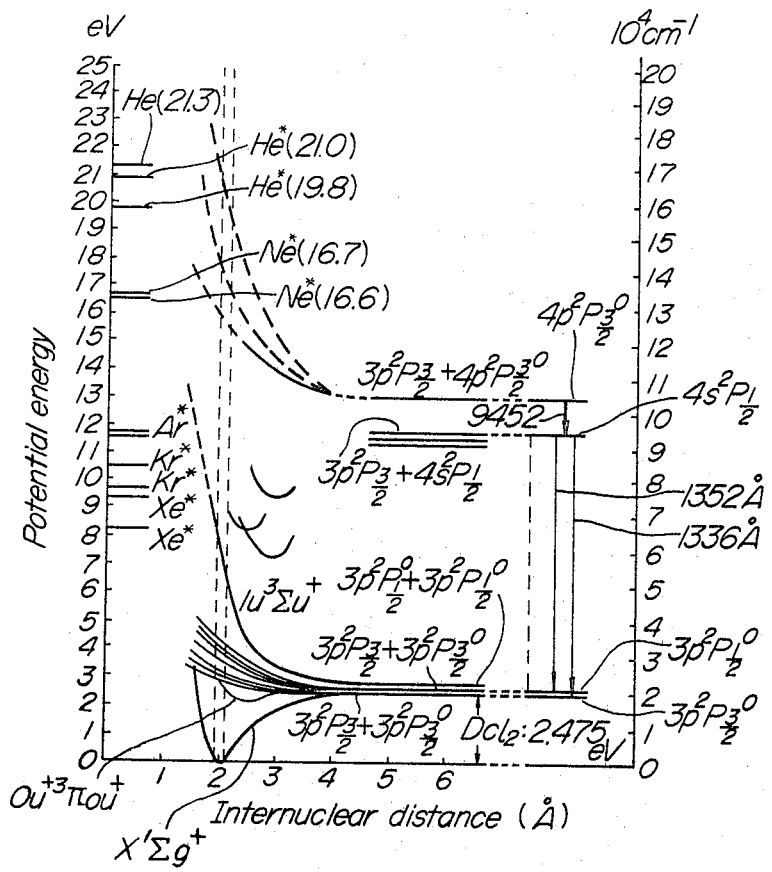
FIG. 1 is characteristic curves showing the variation of molecular potential energy with respect to internuclear distance of chlorine molecules.

The inventor succeeded in obtaining a laser line of 9452 A. corresponding to the $4p^2P^0_{3/2}$–$4s^2P_{1/2}$ transition of neutral chlorine atom as a result of various experiments employing a mixture gas of $CCl_2F_2$ (Freon) and He or Ne, the output of which was 10 mw. in an optimum condition. The gain thereof is more than 5%/m., and is the largest among this kind of gas lasers hitherto known. The mechanism of this lasing may be explained as follows. Since the laser line is 9452 A. resulting from $4p^2P^0_{3/2}$–$4s^2P_{1/2}$ transition of the neutral chlorine atom, it is assumed that the Freon dissociates to first yield $Cl_2$ molecule, which in turn dissociates into Cl atoms. FIG. 1 shows the energy level diagram of a neutral chlorine atom ClI pertaining to the oscillation together with the potential curves of a chlorine molecule. If a ground state molecule $X^1\Sigma^+_g$ of chlorine collides with a metastable atom Ne* or He* (sometimes He (21.3 ev.) may behave metastably), the excitation energy is transferred from the metastable atom to the ground state molecule to excite it to a state having an internuclear distance lying within the range indicated by vertical dotted lines according to the Franck=Condon principle. Thus, the molecule is excited to a state having a possible repulsive potential curve by the collision with Ne* or He*, immediately after which it dissociates to produce ClI ($4p^2P^0_{3/2}$). That is, the upper state ClI$4p^2P^0_{3/2}$ of laser transition is selectively attained. One the other hand, from the lower state of the laser transition, a transition to a still lower state takes place with high transition probability. Consequently, there is a possibility that a population inversion is realized between the levels $4p^2P^0_{3/2}$ and $4s^2P_{1/2}$. Therefore, if the gas mixture is subjected to a discharge in an optical cavity, the line due to this transition may oscillate.

Contrary to Ne and He, Kr and Xe function to suppress the oscillation, the reason for which is conceived as that they excite $Cl_2$ molecule to a state having a known repulsive potential curve lying at a relatively lower position, selectively giving rise to the metastable chlorine atom Cl* ($3p^2P^0_{1/2}$) which is excited to the lower level of the laser transition $4s^2P_{1/2}$ which is to have a large cross-section of electron impact and hence the realization of the population inversion is prohibited.

The experimental result of the influence of a partial pressure of Ne or He on the lasing intensity of Cl line in the mixture gas of Freon and Ne is shown in FIG. 2 with respect to each partial pressure of Freon gas. A similar result is obtained for a mixture gas of Freon and He. From these results it can be seen that the lasing intensity is markedly enhanced by adding Ne or He thereto.

When another rare gas Ar, Kr or Xe or nitrogen gas $N_2$ is added, the result thereof is as shown in FIG. 3, from which the suppression of lasing by these gases can be seen.

The oscillation conditions of gas lasers arising from the molecular dissociation caused by the aforementioned collision with an atom is looser, considering the oscillation principle thereof, than gas lasers based on other mechanisms. Therefore, there is a possibility of lasing for many molecular gases.

The output power and gain of each of hitherto known lasers have been small, at maximum 1 mw. and 3%/m., respectively, whereas those of the lasers according to the present invention are 10 mw. and 5%/m. or more, respectively.

The oscillation wavelength of the laser according to the present invention is 9452 A. No gas laser oscillating in this wavelength region has hitherto been known except nitrogen and carbon lines disclosed in the inventor's said Japanese patent application No. 38,509/64, the output power of which is low.

Also, it has been found that chlorine gas can be employed for the oscillation of chlorine lines. However, as is well known, chlorine is poisonous and heavily contaminates the inner walls of discharge tubes and electrodes. On the contrary, Freon is far less noxious and contaminative, and hence the treatment thereof is easy.

What I claim is:
1. A gas laser employing a gas mixture of $CCl_2F_2$ and a rare gas as a laser material.
2. The gas laser according to claim 1 wherein said rare gas is a gas selected from the group consisting of Ne, He and Ar.
3. The gas laser according to claim 1 wherein said rare gas is Ne.
4. The gas laser according to claim 1 wherein said rare gas is He.

References Cited

Polanyi, Proposal for an Infrared Maser Dependent on Vibrational Excitation, J. Chem. Phys., vol. 34 (January 1961), pp. 347 and 348.

Chemical Laser Efforts Broaden Scope of Laser Research, Chemical and Engineering News, vol. 8 (1965), pp. 38–40.

JEWELL H. PEDERSEN, Primary Examiner

WILLIAM L. SIKES, Assistant Examiner

U.S. Cl. X.R.

330—4.3